United States Patent [19]
Uffner

[11] 3,886,113
[45] *May 27, 1975

[54] METAL-AMINE COMPLEX ACCELERATOR FOR POLYESTER RESIN CURING

[75] Inventor: Melville W. Uffner, Glen Mills, Pa.

[73] Assignee: Air Products and Chemicals, Inc., Allentown, Pa.

[ * ] Notice: The portion of the term of this patent subsequent to Apr. 16, 1991, has been disclaimed.

[22] Filed: Feb. 25, 1974

[21] Appl. No.: 445,710

Related U.S. Application Data

[63] Continuation-in-part of Ser. No. 285,907, Sept. 1, 1972, Pat. No. 3,804,799.

[52] U.S. Cl................. 260/40 R; 260/863; 260/873
[51] Int. Cl............................................ C08g 51/04
[58] Field of Search................... 260/863, 40 R, 873

[56] References Cited
UNITED STATES PATENTS

| | | | |
|---|---|---|---|
| 3,644,612 | 2/1972 | Meyer et al..................... | 260/863 X |
| 3,804,799 | 4/1974 | Uffner............................ | 260/863 X |

Primary Examiner—Donald E. Czaja
Assistant Examiner—S. M. Person
Attorney, Agent, or Firm—Harold A. Horman; Barry Moyerman

[57] ABSTRACT

Metal complexes formed of triethylene diamine compounds with salts of cobalt and manganese are used as accelerators in the free-radical initiated curing and cross-linking of unsaturated polyester resins.

15 Claims, 2 Drawing Figures

METAL-AMINE COMPLEX ACCELERATOR FOR POLYESTER RESIN CURING

CROSS-REFERENCE TO RELATED APPLICATION

The present application is a continuation-in-part of U.S. application Ser. No. 285,907, filed Sept. 1, 1972, now issued as U.S. Pat. No. 3,804,799.

BACKGROUND OF THE INVENTION

The present invention pertains to curing of unsaturated polyester resins in admixture with vinyl monomers and is particularly concerned with promoting or accelerating the cross-linking of such polyester with the vinyl monomer during curing while retaining desired long shelf life during storage of the premix at ambient room temperatures.

The copolymerization of unsaturated polyester resins with vinyl monomers in the presence of free-radical generating compounds such as organic peroxides is well known in the art. Among the vinyl monomers suggested or employed are: methyl methacrylate, vinyl chloride, vinyl acetate, vinyl toluene, and styrene; the last named being largely preferred. The unsaturated polyesters are obtained by reacting one or more dihydric alcohols with an unsaturated dibasic carboxylic acid such as cis-butenedioic acid (maleic acid) or its anhydride or trans-butenedioic acid (fumaric) or mixtures of these, sometimes in the presence of a saturated dicarboxylic acid such as phthalic or isophthalic. The monomer may comprise 30 to 70 percent by weight of the admixture with the unsaturated polyester.

A wide range of organic peroxide catalysts, called "initiators," are known and have been commercially employed for the polymerization of unsaturated polyesters and their copolymerization with vinyl monomers. These function by way of undergoing cleavage of the peroxide linkage to form highly active free radicals which initiate the polymerization reaction. These peroxide initiators vary widely as to the temperature at which they initially undergo cleavage and as to the rate of decomposition to provide free radicals at any given temperature. Accelerators, also called promoters, are frequently used to speed up free radical formation from the peroxide at lower temperatures, particularly in connection with formulations intended to be cured at or about room temperature.

Among the more frequently suggested and more widely used accelerators are dimethyl aniline and cobalt naphthenate. Cobalt naphthenate and other metallic soaps generally are proposed for use with ketone peroxides in cold cure formulations. While dimethyl aniline is known to accelerate benzoyl peroxide at room to moderate temperatures, cobalt naphthenate does not do so. On the other hand, neither of these promoters is effective with t-butyl peroctoate at room temperature. It is possible to obtain reduced gel and cure times at elevated temperature in polyester systems employing t-butyl peroctoate initiator by the use of certain promoters, dimethylaniline being more effective for this purpose than cobalt naphthenate.

A wide use of unsaturated polyester-styrene copolymer systems is in sheet molding compound (SMC) and bulk molding compound (BMC) which comprise the resin reinforced with glass fibers and which generally contain fillers and thickeners. These systems employ initiators that decompose at higher temperatures and further necessitate longer term storage stability than the general purpose resins. While by the inclusion of effective promoters the gel and cure time of such fibrous glass reinforced plastics can be accelerated, these accelerators generally have an adverse effect on required storage stability of the uncured system. Moreover, most BMC and SMC formulations also include a thermoplastic resin, such as an acrylic polymer, to reduce shrinkage during cure. These acrylic polymers are incompatible with the unsaturated polyester and phase rapidly after blending, often resulting in an undesirable mottled surface of the cured product particularly accentuated when the cure is accelerated.

Typical formulations for bulk molding and sheet molding mixes are set out below.

| Resin system | p.b.w. BMC | p.b.w. SMC |
|---|---|---|
| 60 parts polyester resin) 40 parts acrylic polymer) each dissolved in styrene monomer) | 25 | 28 |
| Filler (such as calcium carbonate) | 55 | 42 |
| Catalyst | <1 | <1 |
| Thickener (magnesium hydroxide) | <1 | <1 |
| Glass reinforcement | 20 | 30 |

Among favored peroxide catalysts employed are t-butyl perbenzoate and/or t-butyl peroctoate and sometimes blends of either or both of these with a "hotter" initiator such as benzoyl peroxide. Depending in part upon the particular catalyst or mixture of catalysts used these may constitute about 0.5 to 2.0 percent by weight of resin in the formulation. The thickening agent is generally about 2–3 percent by weight of the resin component. A lubricant, such as zinc stearate (1–2 percent) is generally included in BMC and SMC compositions.

In my aforesaid earlier application Ser. No. 285,907, certain novel polymeric co-ordination complexes of triethylene diamine (TEDA) or a homologue thereof, with a cobalt salt are described as accelerators or promoters for use in peroxide initiated copolymerization of unsaturated polyester-vinyl monomer resin systems. These novel metal-amine complexes are effective in reducing gel and cure time of these resins, while retaining sufficient stability to enable the resin compositions to be stored at ambient temperature for desired periods.

STATEMENT OF THE INVENTION

It has now been found that the activity of the cobalt-triethylene diamine complexes of the aforesaid earlier application can be desirably moderated by the inclusion in such complex of manganese.

Such moderation of the promoter activity is particularly desirable in the handling of bulk molding compound (BMC) and sheet molding compound (SMC). While rapid cure of the polyester is desired, commensurate with adequate flow-out time in hot matched-die molds, if such flow-out time is too short, the compound exhibits pre-gel before the mold is filled in compression. This is manifested as flow marks and/or incomplete molding. In some instances too fast gelation can be compensated by either judiciously distributing BMC or SMC evenly over most of the mold or by keeping the female part of the mold cooler than the male part. But when molds are large and deep these compensating expedients are not reliably effective in overcoming the problems of pre-gel formations.

In accordance with the present invention, utilizing the moderated promoter comprising a metal co-ordination complex of a triethylene diamine compound with cobalt and manganese, the pre-gel problem is eliminated with but a small sacrifice in cure time. Moreover, the advantages of desirably long shelf life are retained or improved.

DESCRIPTION OF THE DRAWINGS

In the accompanying drawings.

DETAILED DESCRIPTION OF THE INVENTION

Figure 1:
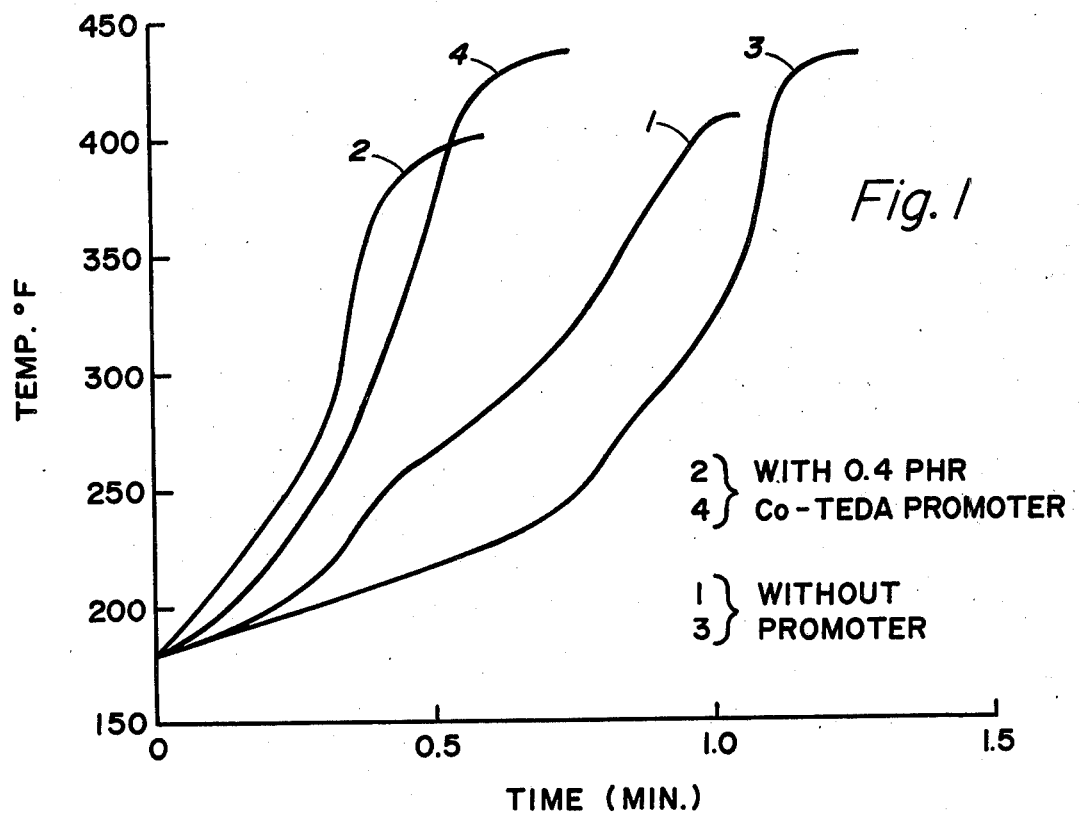
FIG. 1 is a group of graphs comparing the SPI block exotherms of certain polyester resin copolymers with and without the use of cobalt-triethylene diamine complex promoter.

The co-ordination complexes of cobalt and manganese can be prepared by dissolving the triethylene diamine compound in a glycol or other suitable solvent such as, for example, styrene. The salts of cobalt and manganese can be similarly dissolved in a common solvent together, or separately dissolved and the solutions thereafter admixed. The dissolution of these salts as well as that of the triethylene diamine compound can be effected at room temperature or above (up to 100°C, or higher if desired). The salt solution or solutions are combined with the solution of the triethylene diamine compound under agitation, optionally with moderate heating, until a smooth homogenous liquid blend is obtained. The stable complex is formed upon cooling to room temperature.

Although stable metal complexes of triethylene diamine with salts of cobalt and manganese can be formed over a wide range of molar ratios of metal to heterocyclic base, it has been found that those containing at least one mol of the triethylene diamine compound per mol of metal, obtain optimum shelf life for the promoted polyester resin system. The metal amine complex should contain per mol of the triethylene diamine compound at least one-fourth mol each of the cobalt and manganese components; that is, the atomic ratio of Co/Mn in the complex is preferably in the range of 3:1 to 1:3. The preferred complex is one prepared from the divalent chlorides or acetates of cobalt and manganese with the molar amount of cobalt salt equal to or in excess of the amount of manganese salt. At least one and preferably both of the salts are best employed in the form of their hydrates. In many formulations the acetates are favored over the chlorides, because the former form stable solution complexes more readily.

The preparation of a stable co-ordination complex from triethylene diamine with cobalt and manganese is illustrated in Example 1 below, employing one-half mol each of the metal salts per mol of triethylene diamine.

EXAMPLE 1

|  | pbw |
|---|---|
| $CoAc_2 \cdot 4H_2O$ | 5.3 |
| $MnAc_2 \cdot 4H_2O$ | 6.2 |
| glycerol | 50.0 |

EXAMPLE 1-Continued

|  | pbw |
|---|---|
| dipropylene glycol (DPG) | 20.3 |
| Triethylene diamine 33% solution in DPG | 17.2 |

The glycerol and dipropylene glycol were combined and the cobalt and manganese salts stirred in at room temperature until dissolved. The triethylene diamine solution was then added and agitation continued, obtaining a smooth homogenous blend.

Triethylene diamine (TEDA) also known as diazabicyclo (2.2.2) octane, is available commercially (under the registered trademark DABCO) from Air Products and Chemicals, Inc. Its preparation is described in U.S. Pat. No. 2,937,176. The preparation of several homologues of triethylene diamine, including the 2-methyl and the 2,4 dimethyl compounds, is described in U.S. Pat. No. 3,167,518.

For use in polyester resin formulations, it is not necessary to prepare the metal complex of the TEDA compound in advance. The solution or solutions of the metal salts and the TEDA compound can be separately incorporated in the resin formulation in desired proportions and the metal complex will be formed, at least in part, in situ during blending and standing of the resin mixture.

The TEDA-metal complex or the mixture of components entering into such complex is effective in promoting controlled curing and cross-linking of unsaturated polyester resin mixtures when such promoter is employed in amounts even less than 1 percent by weight of the resin, as from about 0.2 to about 0.8 percent. Higher amounts do not appear to have any adverse effect. Typical compositions for bulk or sheet molding may comprise:

|  | parts by weight |
|---|---|
| Unsaturated polyester resin plus thermoplastic resin and vinyl monomer | 25–30 |
| $CaCO_3$ filler | 40–55 |
| Lubricant (e.g. zinc stearate) | 1–2 |
| glass reinforcement, ¼" to 1" chopped strand | 10–30 |
|  | PHR |
| TEDA/Co/Mn complex | 0.2–0.8 |
| Thickener, $Mg(OH)_2$ | 2–3 |
| Catalyst | 0.8–1.2 |

These materials are blended in a heavy duty kneader to effect thorough homogeniety. The blended charge (premix) is then matured for several days, cut to convenient size, molded and cured at 250°–325°F for a short time, usually one to three minutes.

To determine the performance characteristics of various combinations and different amounts of the TEDA/cobalt complexes with and without added manganese and as compared to controls, the tests were run on the basic resin mixtures (neat), i.e., without filler, thickener, lubricant, and glass reinforcement. The gel time, rate of cure and peak exotherm of the composition are determined by the standard Block Test Method using SPI Procedure for Running Exotherm Curves (Preprint for the 24th Annual Technical Conference, 1969; Reinforced Plastics/Composites Division; The Society of Plastics Industry).

The tests below were conducted to determine the effect on rate of cure of cobalt and manganese salts used individually as compared to their combined use. The basic resin formulation comprised:

|  | pbw |
|---|---|
| Paraplex P-19C (Rohm & Haas) | 100 |
| t-butyl perbenzoate (TBP) | 1 |
| metal promoter | 0.4 |

The reported shelf life was determined by storing 100 gram charges of each of the neat compositions in capped jars at ambient room temperature immediately after compounding. The jars were inverted at least once a day until gelation occured, as evidenced by failure of the composition to flow. The number of days to gelation was recorded as shelf life.

Paraplex P-19C is a mixture of about 60 parts Paraplex P-340 with 40 parts Paraplex P-681. The P-340 is a styrene solution of a highly reactive polyester resin made from glycols (7.3 mols propylene to 0.7 mols ethylene) with cis and trans butenedioic acid and containing a small amount of free butenedioic acid. The P-681 resin is a styrene solution of polymethyl methacrylate.

The results of the tests are reported in Table 1 below:

TABLE I

|  | % Co in Promoter Solution | % Mn in Promoter Solution | Shelf Life at RT | Cure Time (Minutes) |
|---|---|---|---|---|
| CoAc$_2$.4H$_2$O | 1.5 | — | 60 days | 1.4 |
| CoAc$_2$.4H$_2$O | 3.0 | — | 43 days | 1.2 |
| MnAc$_2$.4H$_2$O | — | 1.5 | 8 months | 2.4 |
| MnAc$_2$.4H$_2$O | — | 3.0 | 8 months | 2.4 |
| CoAc$_2$.4H$_2$O plus MnAc$_2$.4H$_2$O | 1.5 | 1.5 | 100 days | 1.8 |
| Control (no metal) | — | — | 8 months | 2.3 |

It appears from the above tests that manganese salt used alone, as distinguished from the cobalt salt above, does not accelerate the cure of these resin formulations. When the two are used together the accelerating action of the cobalt salt is attenuated.

In the tests recorded in Table II below the resin mixture employed comprised 60 parts of a styrene solution of Paraplex P-340 with 40 parts of a styrene solution of polymethylmethacrylate (Paraplex P-701). These tests were conducted to determine the rate of cure at 300°F of the metal complex formed from TEDA with cobalt and manganese salts.

|  | Complex A | Complex B |
|---|---|---|
|  | Molar Ratios | Molar Ratios |
| CoAc$_2$.4H$_2$O | 1 | 0.5 |
| MnAc$_2$.4H$_2$O | 0.5 | 0.5 |
| TEDA | 1.5 | 1.0 |

TABLE II

| RUN NO. | 1 | 2 | 3 | 4 |
|---|---|---|---|---|
| Resin Mixture | 100 | 100 | 100 | 100 |
| t-butyl perbenzoate | 1 | 1 | 1 | 1 |
| Complex A | 0.4 | — | — | — |
| Complex B | — | 0.4 | 0.8 | — |
| SPI Block Exotherm at 300°F |  |  |  |  |
| Gel Time (min.) | 0.83 | 1.12 | 0.95 | 1.54 |
| Cure Time (min.) | 1.13 | 1.43 | 1.25 | 1.90 |
| Peak Exotherm °F | 437 | 419 | 445 | 440 |

It will be observed from the data reported in Table II that gel time increases as the Mn concentration is increased.

Tests similar to that reported in Table II above were also carried out with another commercial resin mixture of an acrylic modified polyester blend including styrene monomer. The results of these runs are reported in Table III below.

TABLE III

| RUN NO. | 1 | 2 | 3 |
|---|---|---|---|
| Composition |  |  |  |
| Polyester resin (Selectron* RS 50239) | 60 | 60 | 60 |
| Acrylic Resin (Selectron* 5990) | 37 | 37 | 37 |
| Styrene Monomer | 3 | 3 | 3 |
| t-butyl perbenzoate | 1 | 1 | 1 |
| Complex B | — | 0.4 | 0.8 |
| SPI Block Exotherm at 300°F |  |  |  |
| Gel Time, min. | 1.05 | 0.79 | 0.60 |
| Cure Time, min. | 1.41 | 1.12 | 0.98 |
| Peak Exotherm, °F | 431 | 439 | 429 |

*Selectron is a trademark of PPG Industries

Figure 2:
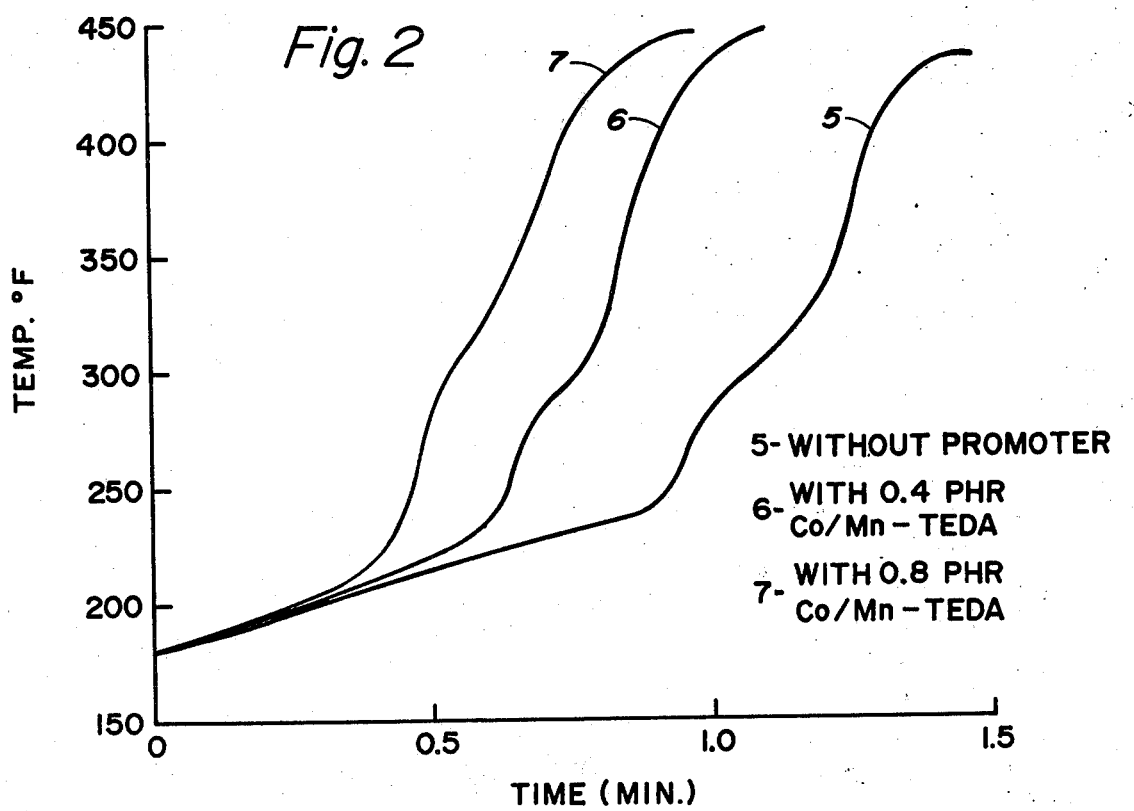
FIG. 2 is a group of graphs of the SPI block exotherms of similar resin systems wherein the promoter employed is a cobalt-manganese-triethylene diamine complex, compared with a control without promoter addition.

The beneficial effect of using both cobalt and manganese in the triethylene diamine complex will be best appreciated by reference to the accompanying drawings showing graphs of the respective exothermic reactions, plotting temperature rise in °F against time in minutes. FIG. 1 shows a group of curves comparing resin compositions promoted by a cobalt-TEDA complex with control compositions free of promoter. FIG. 2 shows a group of curves comparing resin compositions promoted by a cobalt-manganese-TEDA complex with control compositions free of promoter.

The formulations tested had the following compositions:

|                              | FIG. 1 |     |     |     | FIG. 2 |     |     |
|------------------------------|--------|-----|-----|-----|--------|-----|-----|
| Curve                        | 1      | 2   | 3   | 4   | 5      | 6   | 7   |
| Selectron RS 50239           | 60     | 60  | 60  | 60  | 60     | 60  | 60  |
| Selectron 5990               | 37     | 37  | 37  | 37  | 37     | 37  | 37  |
| Styrene Monomer              | 3      | 3   | 3   | 3   | 3      | 3   | 3   |
| t-butyl perbenzoate          | 1.5    | 1.5 | 1   | 1   | 1      | 1   | 1   |
| Co-TEDA complex (1:1)        | —      | 0.4 | —   | 0.4 | —      | —   | —   |
| Co-Mn-TEDA complex (0.5/0.5/1) | —    | —   | —   | —   | —      | 0.4 | 0.8 |

Comparing curves 2 and 4 of FIG. 1 with curves 6 and 7 of FIG. 2, the steep climb of the Co—TEDA promoted system is notably apparent as contrasted with the Co—Mn—TEDA promoted system wherein the temperature rise in more gradual, promoted cure closely following the course of an unpromoted cure until the "kick-off" of the initiator occurs. The Co—Mn—TEDA promoter thus provides a desirable period of delay avoiding pre-gel problems.

While the use of the moderated metal complex of TEDA, co-ordinating both Co and Mn in the complex, is particularly beneficial in promoting or accelerating the cure of unsaturated polyester resin systems of the type employed for SMC and BMC formulations, the use of such promoter is not limited thereto, nor to such resin systems containing also thermoplastic resin, such as an acrylic polymer, to reduce shrinkage during cure. In general, the metal complex promoter of the invention can be employed in peroxide or other free-radical initiated resin systems comprising (1) an unsaturated polyester of a dihydric alcohol and an alpha-beta ethylenically unsaturated dicarboxylic acid and (2) an ethylenically unsaturated reactive monomer.

I claim:

1. A curable polyester mixture comprising:
   a. an unsaturated polyester of a dihydric alcohol and an alpha-beta ethylenically unsaturated dicarboxylic acid,
   b. ethylenically unsaturated reactive monomer,
   c. free radical initiating organic peroxide, and
   d. a promoter comprising a triethylene diamine compound at least in part present as a metal coordinated complex with cobalt and manganese salts.

2. A mixture as defined in claim 1 wherein said triethylene diamine compound, in coordinated and free form, is present in an amount at least of equal molar proportion to the cobalt and manganese salts together.

3. A mixture is defined in claim 2 wherein said cobalt and manganese salts are present in the molar ratio of Co:Mn ranging from 1:3 to 3:1.

4. A mixture as defined in claim 1 wherein said promoter is a preformed metal complex composed of at least one mol of triethylene diamine to one half mol each of cobalt and manganese salts.

5. The mixture as defined in claim 4 wherein said cobalt and manganese salts contain the respective metals in divalent form.

6. A mixture as defined in claim 5 wherein said cobalt and manganese salts are in the form of their hydrated acetates.

7. The mixture as defined in claim 4 wherein said cobalt and manganese salts are in hydrated form.

8. A mixture as defined in claim 1 wherein said promoter is obtained by mixing a solution of triethylene diamine with a solution containing salts of cobalt and manganese.

9. A curable mixture for bulk or sheet molding, comprising:
   a. an unsaturated polyester resin compound of an alpha-beta ethylenically unsaturated dicarboxylic acid,
   b. a reactive vinyl monomer,
   c. a thermoplastic resin,
   d. a free radical initiating organic peroxide, and
   e. a metal coordination complex formed from triethylene diamine and an organic solution of divalent metal salts of cobalt and manganese, the molar ratio of triethylene diamine to metal in said complex being at least 1:1.

10. A mixture as defined in claim 9 wherein said organic peroxide comprises t-butyl perbenzoate.

11. A curable polyester composition comprising:
    a. a polyester of at least one butenedioic acid with a dihydric alcohol.
    b. styrene,
    c. thermoplastic acrylic resin,
    d. free radical initiator compound,
    e. metal coordination complex of triethylene diamine with salts of cobalt and manganese, said complex having said triethylene diamine in an amount at least of equi-molar proportion to said metal salts,
    f. thickening agent, and
    g. glass reinforcement fibers.

12. A curable polyester composition comprising:
    a. a polyester of at least one butenedioic acid with dihydric alcohol,
    b. styrene,
    c. polymethylmethacrylate,
    d. free radical initiating organic peroxide, and
    e. a promoter for said peroxide formed by dissolving salts of cobalt and manganese together with a triethylene diamine compound in organic solvent, said triethylene diamine being present in an amount of at least equi-molar proportion to said metal salt.

13. Composition as defined in claim 12 wherein said organic solvent comprises dipropylene glycol.

14. Composition as defined in claim 12 wherein said organic solvent comprises dipropylene glycol and glycerol.

15. Composition as defined in claim 12 wherein said promoter comprises from 1 to 3 parts of cobalt salt to 3 to 1 parts of manganese salt.

* * * * *